United States Patent [19]

Kunz

[11] Patent Number: 4,551,117
[45] Date of Patent: Nov. 5, 1985

[54] DEVICE FOR TRANSMITTING TORQUE TO A REEL OR THE LIKE

[75] Inventor: Wolfgang Kunz, Lörrach-Hauingen, Fed. Rep. of Germany

[73] Assignee: Kunz Maschinen- und Apparatebau GmbH, Lörrach-Hauingen, Fed. Rep. of Germany

[21] Appl. No.: 513,211

[22] Filed: Jul. 12, 1983

[30] Foreign Application Priority Data

Jul. 31, 1982 [DE] Fed. Rep. of Germany ....... 3228739

[51] Int. Cl.[4] .......................... F16D 3/00; F16B 1/04
[52] U.S. Cl. ..................................... 464/106; 403/353
[58] Field of Search ....................... 464/106, 182, 185; 403/341, 383, 353

[56] References Cited

U.S. PATENT DOCUMENTS

| 1,830,394 | 11/1931 | Glass | 464/106 |
| 2,883,838 | 4/1959 | Veitch, Jr. | 464/106 |
| 3,462,179 | 8/1969 | Hinkle | 403/353 X |

FOREIGN PATENT DOCUMENTS

| 11668 | 8/1956 | Fed. Rep. of Germany | 403/341 |
| 571500 | 8/1945 | United Kingdom | 464/106 |

*Primary Examiner*—Stuart S. Levy
*Assistant Examiner*—Thomas R. Hannon
*Attorney, Agent, or Firm*—Peter K. Kontler

[57] ABSTRACT

A torque transmitting connection between a driving shaft and the core of a reel has a barrel-shaped stub which is rigid and coaxial with the core and extends into a complementary socket of a female coupling element at the respective end of the shaft. The female coupling element has a lateral opening which communicates with the socket, and the stub has a lateral flat so that the thickness of the stub, as measured in a plane including the axis of the stub and extending at right angles to the plane of the flat, is approximately four-fifths of the diameter of the stub. The width of the opening slightly exceeds the width of the flat and the aforesaid thickness of the stub. This renders it possible to insert the stub into or to withdraw the stub from the socket by placing the flat into a plane which is normal to the plane of the opening and by thereupon causing the stub to pass through the opening. When the stub is fully inserted into the socket, it is caused to assume an angular position in which the flat extends across the opening, and the stub is then locked in such angular position by a handle which is pivotally mounted on the female coupling element and has an internal surface which is complementary to and is movable into and from a position of overlap with the flat. The surface bounding the socket of the female coupling element extends along an arc of between 250 and 270 degrees and even in excess of 270 degrees.

18 Claims, 4 Drawing Figures

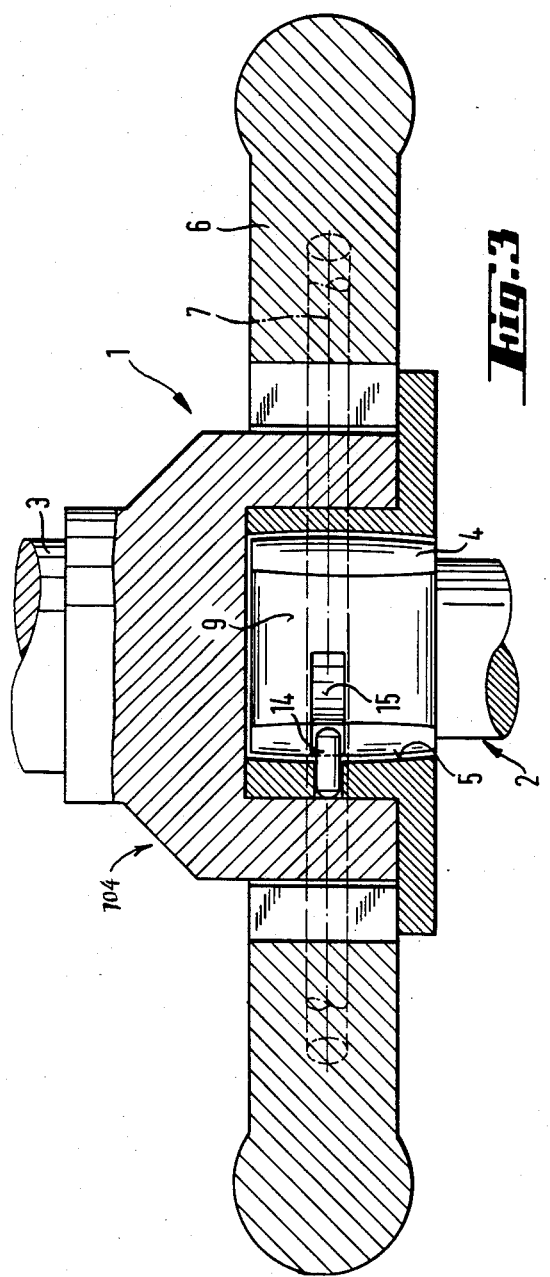

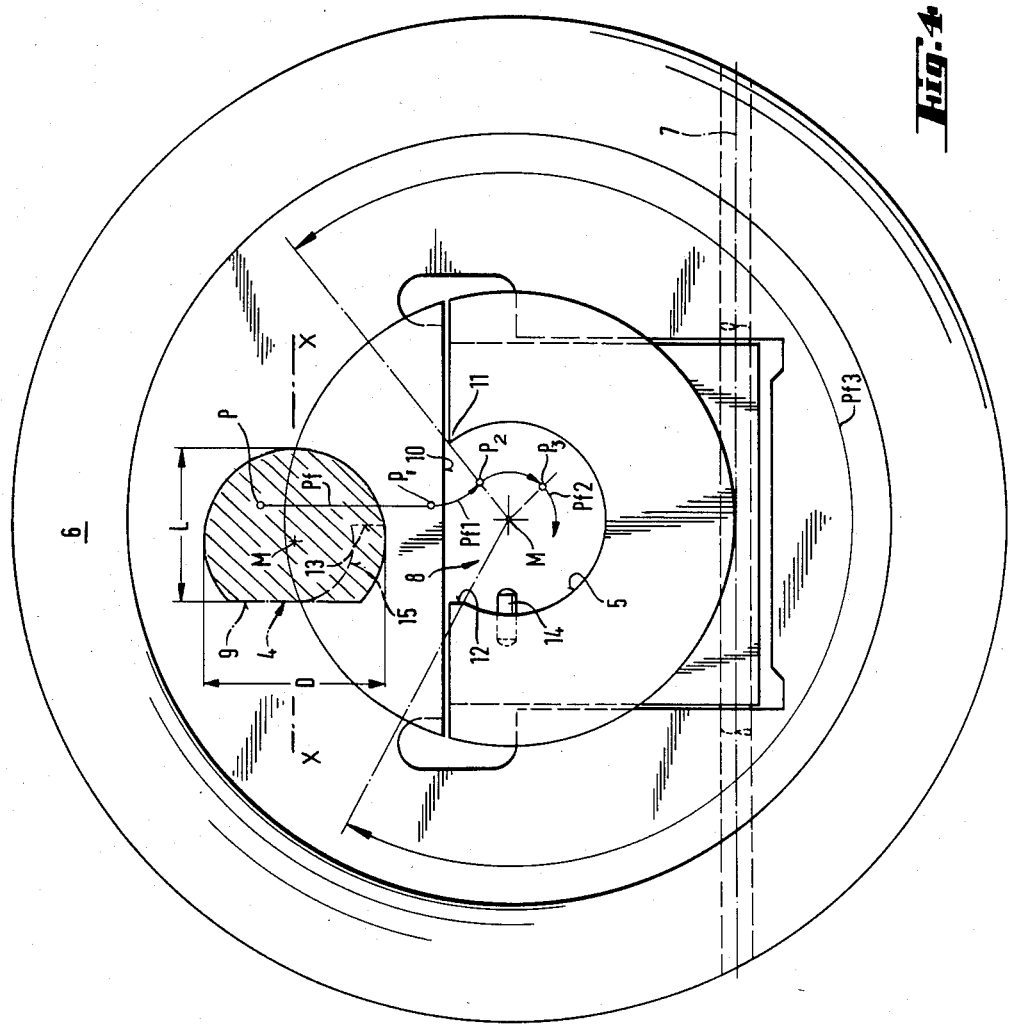

DEVICE FOR TRANSMITTING TORQUE TO A REEL OR THE LIKE

BACKGROUND OF THE INVENTION

The present invention relates to torque transmitting devices in general, and more particularly to improvements in separable torque transmitting connections between rotary driving and driven members, for example, between a shaft and the core of a bobbin, reel or the like. Still more particularly, the invention relates to improvements in torque transmitting connections of the type wherein a male coupling element of the connection is insertable into or removable from a complementary socket which is defined by a female coupling element and wherein the insertion or withdrawal of the male coupling element takes place at right angles to the axes of the coupling elements.

It is already known to couple a rotary driving member with a rotary driven member by means of a torque transmitting connection including a female coupling element which defines a socket and has a lateral opening for insertion or removal of the male coupling element which has one or more flats to ensure that it cannot rotate with reference to the female coupling element. One of these coupling elements is provided on the driving member and the other coupling element is provided on the driven member. Connections of such type can be employed with advantage in winding or unwinding machines for textile materials or the like. Reference may be had to German Pat. No. 917,592 which discloses a separable connection between a driving member and a driven member in a tilting bearing. Similar connections can be used with advantage in so-called sliding bearings. Thus, two male coupling elements at the ends of a reel or the like can be inserted sideways into a pair of complementary female coupling elements, and each male coupling element is thereupon held against rotation relative to the associated female coupling element by a pivotable or shiftable holding or blocking device so that the female coupling elements can transmit torque to the properly inserted reel. The flats of the male coupling elements ensure that such coupling elements cannot turn in the sockets of the respective female coupling elements, i.e., each flat can transmit at least some torque when the female coupling elements are rotated.

In presently known connections of the above outlined character, each male coupling element is formed with several flats. For example, each male coupling element can have a polygonal cross-sectional outline with four facets. This ensures reliable transmission of torque, i.e., the male coupling element can be received in the complementary socket of the associated female coupling element without any slippage. In other words, it is simple to establish a reliable form-locking connection between the external surface of a polygonal male coupling element and the complementary surface bounding the socket of the female coupling element. However, such connections also exhibit a number of drawbacks, especially as concerns the manufacturing cost. Thus, if the polygonal male coupling element is to fit into the socket of a female coupling element without appreciable play, the two coupling elements must be machined with a very high degree of precision, not only for the purpose of ensuring that the male coupling element will accurately fit into and will not wobble in the socket but also to ensure that one of these elements is coaxial with the driving member and the other element is coaxial with the driven member. In addition, it is difficult to ensure accurate engagement with the pivotable handle which must be centered on the driving member with a high degree of accuracy. Another drawback of such conventional connections is that they do not allow for interchange of reels, i.e., for insertion of male coupling elements on any one of a large number of reels into a pair of female coupling elements, unless the tolerances in the dimensioning of surfaces in the sockets and on the male coupling elements are so pronounced that they prevent reliable transmission of torque to the inserted reel. Still further, insertion of polygonal male coupling elements into the sockets of female coupling elements presents many problems because the male and female coupling elements must be moved to predetermined positions relative to one another prior to the inserting step, especially if each male coupling element has one or more pairs of parallel flats.

Attempts to overcome the drawbacks of the just described conventional connections include the provision of male coupling elements having a triangular cross-sectional outline, or the positioning of square male coupling elements in such a way that they are insertable into the sockets of the female coupling elements with one of their corners or edges leading. Such connections are expensive and the male coupling element tends to "climb" out of the socket of the female coupling element when the connection is in the process of transmitting a pronounced torque. The making of round or substantially round male coupling elements involves a greatly reduced expenditure and renders it possible to ensure a more accurate axial alignment between the two coupling elements as well as between the male coupling element and the part to which such coupling element is connected. However, a truly round male coupling element is incapable of transmitting or receiving torque, especially pronounced torque.

OBJECTS AND SUMMARY OF THE INVENTION

An object of the invention is to provide a torque transmitting connection which is simpler and less expensive than but at least as reliable as heretofore known connections.

Another object of the invention is to provide a connection of the above outlined character which can employ a generally round male coupling element.

A further object of the invention is to provide a machine or apparatus which embodies the improved torque transmitting connection.

An additional object of the invention is to provide a novel and improved male coupling element which can be utilized in a connection of the above outlined character.

Still another object of the invention is to provide a novel female coupling element which can be used in the improved connection.

An additional object of the invention is to provide a novel and improved method of transmitting torque between a rotary driving member and a rotary driven member, even if the two members are not in exact axial alignment with one another.

A further object of the invention is to provide a torque transmitting connection which can automatically compensate for manufacturing and/or assembling tolerances and which can be rapidly assembled and rapidly taken apart with a minimum of effort and without resort to special tools.

Another object of the invention is to provide a torque transmitting connection which can be utilized with advantage in machines and/or apparatus wherein the driven member cannot move axially of the driving member and/or vice versa.

An additional object of the invention is to provide a torque transmitting connection wherein the male coupling element is reliably held in the socket of the female coupling element and the two coupling elements are in large-area contact with one another when the male coupling element transmits torque to the female coupling element or vice versa.

The invention is embodied in a separable torque transmitting connection between at least substantially coaxial driving and driven rotary members, for example, between a shaft and the core of a reel. The connection comprises preferably a round (e.g., substantially barrel-shaped) male coupling element which is coaxial and rigid with one of the driving and driven members, which is provided with a lateral flat extending in substantial parallelism with the axis of the male coupling element, and whose thickness (as considered in a plane including the axis of the male coupling element and extending at right angles to the general plane of the flat) exceeds the radius of the male coupling element and preferably does not exceed four-fifths of the diameter of the male coupling element. The connection further comprises a female coupling element which is coaxial and rigid with the other of the driving and driven members and defines a socket which is complementary to the male coupling element. The female coupling element has a lateral opening which communicates with the socket and has a width at least matching the aforementioned thickness of the male coupling element so that the male coupling element is insertable into and withdrawable from the socket by way of the opening on movement of at least one of the two coupling elements to an angular position in which the flat is out of register with the opening to an extent which suffices to ensure that the latter permits the male coupling element to pass therethrough. The width of the flat, as measured at right angles to the aforementioned plane, can equal or approximate the width of the opening. It is normally preferred to select the two widths in such a way that the width of the opening slightly exceeds the width of the flat; to this end, the female coupling element can comprise a recessed edge portion which bounds or flanks one side of the opening.

The male coupling element is rotatable in the socket of the female coupling element, and the two coupling elements preferably comprise stop means serving to arrest the male coupling element in a predetermined angular position with reference to the female coupling element. In such predetermined angular position, the flat of the male coupling element extends across the opening of the female coupling element. The stop means can comprise a first abutment which is provided on one of the coupling elements and a second abutment provided on the other coupling element. The two abutments contact each other in the predetermined angular position of the male coupling element. The first abutment can constitute a projection of the female coupling element which extends into the socket, and the male coupling element is then provided with a recess for the projection and has a shoulder provided in the recess and constituting the second abutment. The recess can extend along an arc of approximately 90 degrees, as considered in the circumferential direction of the male coupling element, and preferably terminates at the flat. This renders it possible to move the flat between a first angular position in which the flat extends across the opening, and a second angular position at an angle of 90 degrees with reference to the first angular position. When the flat assumes such second angular position, the male coupling element can be inserted into or withdrawn from the socket by moving it sideways at right angles to the axis of the female coupling element. The internal surface of the female coupling element, i.e., the surface which bounds the socket, preferably extends along an arc of between approximately 250 and 270 degrees, as considered in the circumferential direction of the female coupling element.

The flat can constitute an at least slightly concave or convex surface, as considered in the axial direction of the male coupling element.

As mentioned above, the two coupling elements are movable to angular positions in which the flat extends across the opening, and the connection preferably further comprises means for releasably holding the coupling elements in such angular positions. The holding means can comprise a blocking member (e.g., a handle in the form of a wheel) having a surface which is at least substantially complementary to the flat, and such blocking member is movable to and from a position in which its surface overlies the flat while the flat extends across the opening. The blocking member can be mounted on one of the coupling elements, e.g., on the female coupling element, for pivotal movement about an axis which is normal to the axis of the female coupling element. If the flat is convex, the pivot axis for the blocking member preferably includes the center of curvature of the flat. When the surface of the blocking member overlies the flat, the blocking member positively holds the male coupling element against rotation in the socket of the female coupling element.

The novel features which are considered as characteristic of the invention are set forth in particular in the appended claims. The improved connection itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a sectional view as seen in the direction of arrows from the line III—III of FIG. 2; and FIG. 4 is a view similar to that of FIG. 2 but showing the male coupling element at a level above the socket of the female coupling element.

DESCRIPTION OF THE PREFERRED EMBODIMENTS

Figure 1:
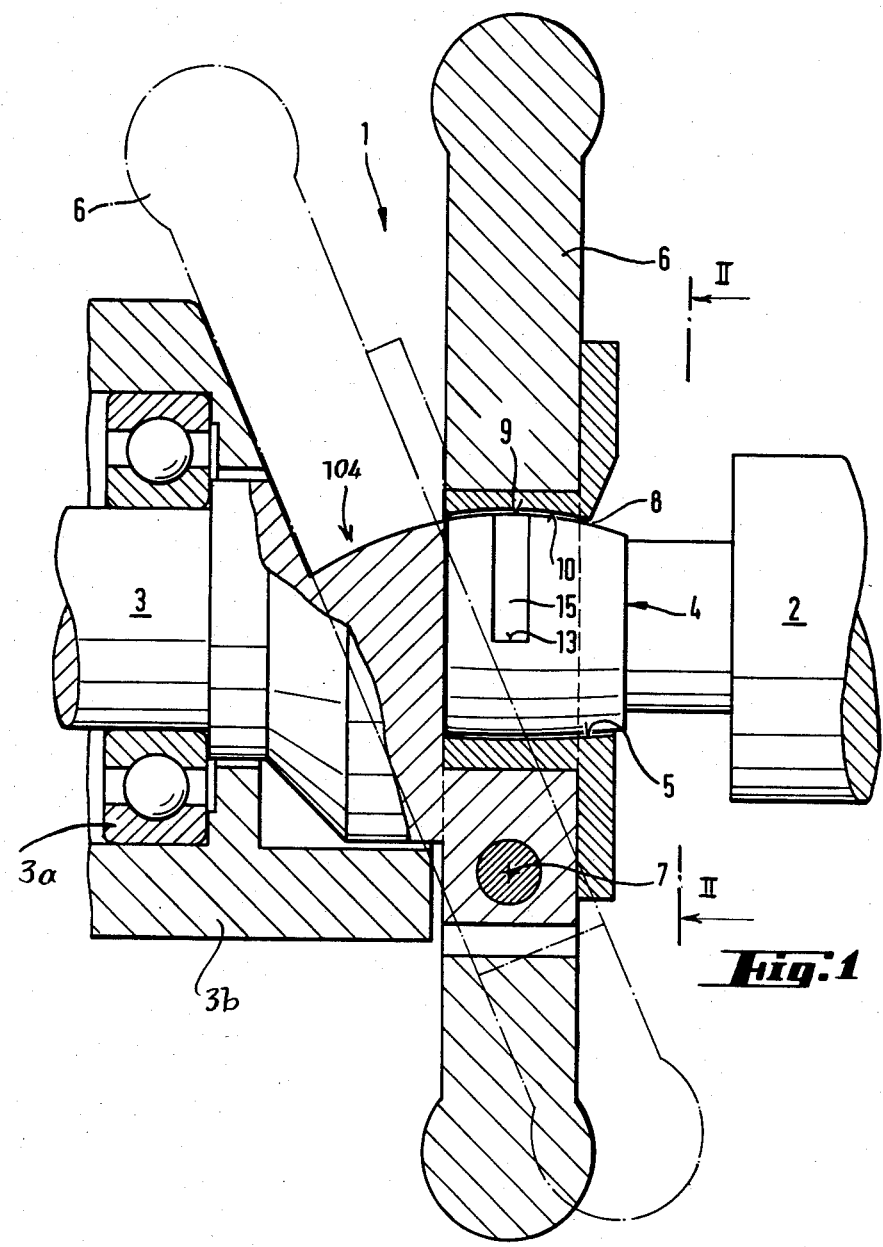
FIG. 1 is an axial sectional view of a torque transmitting connection which embodies the present invention, portions of the driving and driven members being broken away.

Referring first to FIG. 1, there is shown a rotary driving member 3 which can constitute the output shaft of a variable-speed transmission or the output shaft of a motor and is rotatable in one or more antifriction bearings 3a installed in a housing 3b. The driving member 3 is coaxial or nearly coaxial with a rotary driven member 2 which can constitute the core of a bobbin or reel and receives torque from the driving member 3 through the medium of a connection 1 which embodies the present invention. The connection 1 includes a male coupling element 4 (hereinafter called stub for short) which is coaxial and integral (or otherwise rigidly connected) with the driven member 2 and resembles a barrel having a lateral flat 9 which is slightly convex, as considered in the axial direction of the stub 4. The connection 1 further includes a female coupling element 104 which is coaxial and integral (or otherwise rigidly connected) with the driving member 3 and has a socket 5 which is complementary to and normally receives the stub 4. It is clear that the positions of the male and female coupling elements 4, 104 can be reversed, i.e., the male coupling element can be made rigid with the driving member 3 and the female coupling element 104 can form an integral part of the driven member 2.

Figure 2:
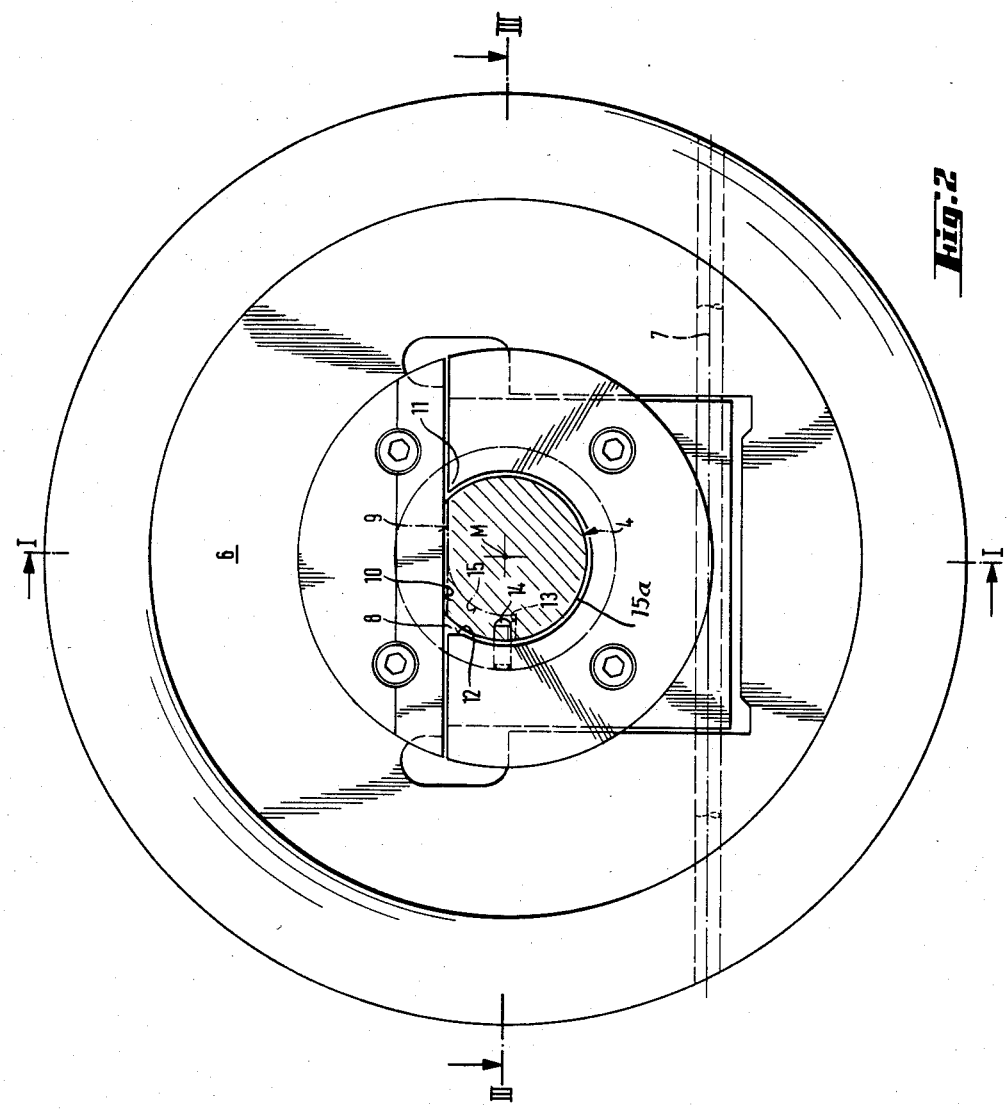
FIG. 2 is a sectional view as seen in the direction of arrows from the line II—II of FIG. 1.

The female coupling element 104 is further provided with a lateral opening 8 (see particularly FIGS. 2 and 4) whose width equals or slightly exceeds the width of the flat 9, as measured in the circumferential direction of the stub 4, but is less than the diameter D of the stub. FIGS. 1, 2 and 3 show the coupling elements 4 and 104 in angular positions such that the flat 9 extends across the opening 8 and is overlapped and engaged by a complementary surface 10 provided on a blocking member 6 serving as a means for holding the two coupling elements against angular movement relative to one another, i.e., for ensuring that the driving member 3 can transmit torque to the driven member 2 or vice versa, depending upon whether the driven member 2 is to convolute a web of textile material therearound or is to pay out such material. The blocking member 6 is a wheel-shaped handle which is mounted on the female coupling element 104 for pivotal movement about an axis which extends at right angles to the axis of the element 104 and includes the center of curvature of the slightly convex flat 9. Such pivot axis is defined by a pivot member 7 which is mounted in the female coupling element 104. The handle 6 can be moved between the (operative) angular position of FIG. 1 in which its internal surface 10 overlies the flat 9, and a second (inoperative) angular position (by pivoting in a counterclockwise direction, as viewed in FIG. 1) in which the surface 10 is out of register with the flat 9 so that the stub 4 can be rotated in the socket 5, preferably through 90 degrees to the angular position which is shown in FIG. 4. This renders it possible to lift the stub 4 out of or to insert the male coupling element into the socket 5.

FIG. 2 shows the stub 4 in an angular position in which the flat 9 extends across the opening 8 and is immediately adjacent to the internal surface 10 of the handle 6 which is held in the operative position of FIG. 1.

The barrel-shaped stub 4 is preferred at this time because it allows for at least some misalignment of the axes of the driving and driven members 3 and 2, i.e., the improved connection 1 can be said to constitute a universal joint which is capable of compensating for certain machining tolerances and for certain inaccuracies in mounting of the driving and driven members. The center of curvature of the slightly concave surface 10 of the handle 6 is also located on the axis of the pivot member 7 so that this surface can readily slide along the flat 9 when the handle is moved to or from the operative position of FIG. 1.

FIGS. 2 and 4 show that the width of the opening is at least slightly less than the diameter D of the stub 4. Such width is slightly greater than the width of the flat 9, as measured in the circumferential direction of the stub 4 and at right angles to a plane X—X which includes the axis M of the stub and is normal to the general plane of the flat 9. The thickness L of the stub 4 in the plane X—X at most equals but is preferably somewhat less than the width of the opening 8, and such thickness preferably does not exceed and is normally less than four-fifths of the diameter D. The surface which bounds the socket 5 of the female coupling element 104 preferably extends along an arc well in excess of 180 degrees, as considered in the circumferential direction of the properly inserted stub 4, most preferably between approximately 250 and 270 degrees and even in excess of 270 degrees. The width of the opening 8 can be increased beyond that of the flat 9 by the simple expedient of slightly recessing one of the two undercut edge portions 11 which flank the opening 8. As can be readily seen in FIG. 2, the left-hand edge portion 11 is provided with a chamfer 12 to thus increase the width of the opening 8. Widening of the opening 8 in the just described or another suitable manner, so that the opening is wider than the flat 9, facilitates insertion of the stub 4 into and extraction of the stub from the socket 5. Since the width of the opening 8 exceeds the thickness L of the stub 4 in the plane X—X, the stub 4 is readily insertable into and removable from the socket 5 in a manner which is illustrated in FIG. 4. At least one of the edge portions 11 can be bounded by a rounded surface. The chamfer 12 is or can be formed by simply removing a part of the respective edge portion 11.

For the sake of convenience, the female coupling element 104 is preferably moved to an angular position in which the opening 8 is disposed in a horizontal plane at a level above the socket 5. The handle 6 is held in the inoperative position and the stub 4 is assumed to be detached from the female coupling element 104 and is about to be inserted into the socket 5. To this end, the stub 4 is moved to an angular position in which the flat 9 is disposed in a vertical plane and the plane X—X is horizontal. In the next step, the stub 4 is moved downwardly (as indicated by the arrow Pf) and into the socket 5. Such movement cannot be prevented by the edge portions 11 which flank the opening 8 because the width of the opening exceeds the thickness L of the stub 4, as measured in the plane X—X. Once the stub 4 has descended into the socket 5 (so that a selected portion of this stub moves from the position P to the postion $P_1$), the stub is moved slightly to the right, as viewed in FIG. 4 (see the arrow Pf1) so that the portion P moves from the position $P_1$ to the position $P_2$, and the stub is thereupon rotated in a clockwise direction (note the arrow Pf2) so that the portion moves from the position $P_2$ to the position $P_3$ whereby the flat 9 extends across the opening 8 (i.e., the flat 9 is located in a substantially horizontal plane) and the handle 6 can be returned to the operative position of FIG. 1. Movement of the inserted stub 4 in the direction of arrow Pf1 enables the major surface of this stub to move into contact with the internal surface of the female coupling element 104 before the stub is rotated (arrow Pf2) in order to move the flat 9 to a position in which it extends across the opening 8. The double-headed arrow Pf3 of FIG. 4 denotes the arc along which the internal surface of the female coupling element 104 surrounds the properly inserted stub 4 when the flat 9 extends across the opening 8.

As mentioned above, the thickness L of the stub 4 in the plane X—X need not and preferably should not exceed four-fifths of the diameter D of the stub. If the thickness L were increased beyond 80 percent of the diameter D, the stub 4 could not be inserted into the socket 5 via opening 8 or the flat 9 would be located at a level above the opening (as viewed in FIG. 2 or 4) in fully inserted position of the stub. This would interfere with pivotal movements of the handle 6 between its operative and inoperative positions. It is clear that the thickness L can be reduced to less than 80 percent of the diameter D; however, this would reduce the length of that portion of the internal surface (note the arrow Pf3 in FIG. 4) of the element 104 which surrounds the socket 5 and is in contact with the inserted stub 4. Also, this would perhaps unduly weaken the stub 4. If L=0.8D, the angle along which the internal surface of the female coupling element 104 contacts the peripheral surface of the stub 4 exceeds 270 degrees (it equals or approximates 274 degrees). An area of contact along an arc of approximately 250 degrees is preferred at this time because this renders it possible to provide the female coupling element 104 with an opening 8 which is somewhat wider than L, i.e., it facilitates insertion of the stub 4 into and removal of the stub from the socket 5 of the female coupling element.

The improved connection 1 is further provided with stop means 13 which ensures that the angular movement of the inserted stub 4 in the direction of arrow Pf2 will be terminated automatically when the flat 9 extends across the opening 8. To this end, the female coupling element 104 comprises a first abutment 14 in the form of a substantially radially extending projection in the socket 5, and the stub 4 is provided with a circumferentially extending arcuate recess 15 one end of which is bounded by a shoulder 15a constituting a second abutment which contacts the abutment 14 as soon as the stub 4 is rotated through approximately 90 degrees so that the flat 9 extends across the opening 8. The recess 15 terminates at the flat 9. The length of the illustrated recess 15, as considered in the circumferential direction of the stub 4, is approximately 90 degrees. The stop means 13 renders it possible to repeatedly move the stub 4 to an optimum angular position with reference to the female coupling element 104 so that the inserted stub will not interfere with movement of the handle 6 from its inoperative position to the operative position of FIG. 1 The illustrated handle 6 is automatically returned from the inoperative position to the operative position of FIG. 1 if the stub 4 is properly inserted into the socket 5 so that the shoulder 15a abuts against the projection 14 and the stub 4 continues to rotate in the direction of arrow Pf2 shown in FIG. 4, i.e., if the member 2 rotates the member 3 in a clockwise direction, as viewed in FIG. 2 or 4, the stub 4 begins to turn the driving member 3 as soon as it completes an angular movement (arrow Pf2) through approximately 90 degrees, i.e., as soon as the flat 9 is moved from a vertical into a horizontal plane.

Separation of the stub 4 from the female coupling element 104 involves a series of steps in a sequence counter to that described in connection with FIG. 4. Thus, the handle 6 is moved to the inoperative position, the stub 4 is rotated counterclockwise through approximately 90 degrees, it is thereupon shifted slightly to the left, as viewed in FIG. 4, and is then lifted out of the socket 5 counter to the direction indicated by the arrow Pf.

The stop means 13 not only facilitates repeated movement of the stub 4 to one and the same angular position with reference to the female coupling element 104 but it is also capable of taking up substantial axial stresses, i.e., the stop means can resist axial movements of the driven member 2 toward or away from the driving member 3 and/or vice versa. This is desirable and advantageous if the improved connection is installed in a structure of the type disclosed in the commonly owned copending patent application Ser. No. 283,379 filed July 15, 1981 by Udo Kunz now U.S. Pat. No. 4460134 . Thus, if the driving member 3 must be shifted axially with or relative to a support, the driven member 2 automatically follows such axial movement of the driving member because the projection 14 engages the corresponding surface in the recess 15 of the stub 4 and compels the driven member 2 to share the axial movement of the driving member. The same holds true if the driven member 2 is shifted axially, i.e., the stop means 13 then ensures that the driving member 3 shares such axial movement of the driven member. The stop means 13 is further capable of shifting the driven member 2 sideways in response to sidewise shifting of the driving member 3 and/or vice versa. The disclosure of Ser. No. 283,379 is incorporated herein by reference.

It is clear that the torque transmitting connection of the present invention can employ a cylindrical stub with a flat 9 which is neither concave nor convex, as considered in the circumferential and/or axial direction of the stub. As explained above, the utilization of a substantially barrel-shaped stub 4 is preferred at this time for a number of reasons. Thus, the stub can take up or transmit pronounced stresses acting at right angles to its axis, and it allows for at least some flexing of the driven member 2 by changing its angular position in the socket 5 about an axis which intersects and is normal to the axis of the stub. Moreover, a barrel-shaped stub can compensate for eventual lack of accurate alignment of two handles 6 if each end portion of the driven member 2 carries a stub which can be secured against rotation relative to the corresponding female coupling element by a discrete handle 6. The barrel-shaped stub and the associated female coupling element can be said to constitute a simple but highly effective universal ball joint which allows for a plurality of different movements of the driving and driven members 3, 2 relative to one another but is nevertheless capable of transmitting torque from the member 3 to the member 2 or vice versa.

As also mentioned above, the flat 9 is preferably slightly convex, as considered in the axial direction of the stub 4, so as to ensure full surface-to-surface contact with the handle 6 when the latter assumes its operative position shown in FIG. 1. The centers of curvature of the convex flat 9 and concave surface 10 of the handle 6 are then located on the axis of the pivot member 7. Such configuration of the flat 9 and surface 10 facilitates the movements of the handle 6 between the operative and inoperative positions and further contributes to reliable transmission of torque between the stub 4 and the coupling element 104. Still further, such configuration of the flat 9 and the surface 10 contributes to compensation for at least some machining tolerances and/or lack of utmost accuracy in assembling the driving and driven members 3, 2 with one another. Last but not least, such configuration of the flat 9 and surface 10 ensures that the illustrated handle 6 does not interfere with movements of the handle at the other axial end of the driven member 2 to and from the operative position, even if the mounting of the two handles on the respective female coupling elements 104 is not identical.

An important advantage of the improved connection is that it allows for insertion of the stub 4 into and for removal of the stub from the socket 5 by moving the stub at right angles to its axis or by moving the female coupling element 104 at right angles to its axis. This is of importance in many types of machines in which there is no room for insertion or extraction of the stub by moving it in the axial direction of the driving and driven members. Another important advantage of the improved connection is that the male coupling element can constitute a substantially round stub, i.e., each cross section of the stub has a circular shape save at the locus of the flat 9. Such stub can be machined with utmost accuracy at a fraction of the cost of a polygonal stub.

The improved connection is susceptible of many additional modifications without departing from the spirit of the invention. For example, the positions of the recess 15 and projection 14 can be reversed, or the connection can comprise more than a single stop means 13. Also, the flat can be slightly concave if the pivot axis of the handle 6 is located at a level above the stub 4, as viewed in FIG. 1. Also, the flat need not be concave or convex if the handle 6 is replaced with a blocking member which is slidable in parallelism with the axis of the stub 4 or in parallelism with the axis of the female coupling element 104 in order to move its surface into or from a position of overlap with the flat of the stub. The major portion of the peripheral surface of the stub can be concave if the socket is bounded by a complementary (convex) surface. This also allows for at least some misalignment of the axes of the driving and driven members 3 and 2 as well as for some flexing of the driven member 3 so that the stub changes the position of its axis with reference to the axis of the female coupling element.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A separable torque transmitting connection between at least substantially coaxial driving and driven rotary members, such as between a shaft and the core of a reel, comprising a substantially round male coupling element coaxial and rigid with one of said driving and driven members, provided with a lateral flat and having a predetermined thickness as considered in a plane including the axis of said coupling element and extending at right angles to the flat; a female coupling element coaxial and rigid with the other of said driving and driven members and defining a socket complementary to said male coupling element and having a lateral opening communicating with said socket and having a width at least matching said thickness so that said male coupling element is insertable into and withdrawable from said socket via said opening on movement of at least one of said coupling elements to an angular position in which said flat is out of register with said opening so that the latter permits the male coupling element to pass therethrough, said coupling elements being movable to angular positions in which said flat extends across said opening; and means for releasably holding said coupling elements in such angular positions, said holding means comprising a blocking member mounted on said female coupling element for pivotal movement about an axis which is normal to the axis of said female coupling element, said blocking member having a surface which is at least substantially complementary to said flat and being pivotable to and from a position in which said surface thereof overlies said flat while said flat extends across said opening.

2. The connection of claim 1, wherein said male coupling element has a predetermined radius and said thickness exceeds said predetermined radius of said male coupling element.

3. The connection of claim 1, wherein said flat has a predetermined width, as measured at right angles to said plane, and said predetermined width equals or approximates the width of said opening.

4. The connection of claim 1, wherein said male coupling element has a predetermined diameter and said thickness is at most four-fifths of said predetermined diameter of said male coupling element.

5. The connection of claim 1, wherein said flat has a predetermined width, as considered at right angles to the axis of said male coupling element, and the width of said opening exceeds said predetermined width of said flat.

6. The connection of claim 5, wherein said female coupling element includes a recessed edge portion bounding one side of said opening.

7. The connection of claim 1 wherein said male coupling element is rotatable in the socket of said female coupling element and said coupling elements comprise stop means arranged to arrest said male coupling element in a predetermined angular position with reference to said female coupling element.

8. The connection of claim 7, wherein said stop means comprises a first abutment provided on one of said coupling elements and a second abutment provided on the other of said coupling elements, said abutments being in contact with one another in said predetermined angular position of the male coupling element.

9. The connection of claim 1, wherein said female coupling element has an internal surface bounding said socket and extending along an arc of between approximately 250 and 270 degrees.

10. The connection of claim 1, wherein said flat constitutes an at least slightly convex surface, as considered in the axial direction of said male coupling element.

11. The connection of claim 1, wherein said male coupling element is barrel-shaped.

12. A separable torque transmitting connection between at least substantially coaxial driving and driven rotary members, such as between a shaft and the core of a reel, comprising a substantially round male coupling element coaxial and rigid with one of said driving and driven members, provided with a lateral flat and having a predetermined thickness as considered in a plane including the axis of said coupling element and extending at right angles to the flat; and a female coupling element coaxial and rigid with the other of said driving and driven members and defining a socket complementary to said male coupling element and having a lateral opening communicating with said socket and having a width at least matching said thickness so that said male coupling element is insertable into and withdrawable from said socket via said opening on movement of at least one of said coupling elements to an angular position in which the flat is out of register with said opening so that the latter permits the male coupling element to pass therethrough, said male coupling element being rotatable in the socket of said female coupling element and said coupling elements comprising stop means arranged to arrest said male coupling element in a predetermined angular position with reference to said female coupling element, said stop means comprising a first abutment including a projection provided on said female coupling element and a second abutment provided on said male coupling element, said male coupling element having a recess for said projection and a shoulder provided in said recess and constituting said second abutment, said projection and said shoulder being in contact with one another in said predetermined angular position of said male coupling element.

13. The connection of claim 12, wherein said recess extends along an arc of approximately 90 degrees, as considered in the circumferential direction of said male coupling element, and terminates at said flat.

14. The connection of claim 12, wherein said coupling elements are movable to angular positions in which said flat extends across said opening and further comprising means for releasably holding said coupling elements in such angular positions.

15. The connection of claim 14, wherein said holding means comprises a blocking member having a surface which is at least substantially complementary to said flat, said blocking member being movable to and from a position in which said surface thereof overlies said flat while said flat extends across said opening.

16. The connection of claim 15, wherein said flat is at least slightly convex, as considered in the axial direction of said male coupling element.

17. The connection of claim 12, further comprising a handle arranged to hold said coupling elements against rotation relative to one another while said male coupling element is confined in said socket and said flat extends across said opening, said handle being mounted on one of said coupling elements and having a surface which is at least substantially complementary to said flat and is movable into and from a position of overlap with said flat.

18. A separable torque transmitting connection between at least substantially coaxial driving and driven rotary members, such as between a shaft and the core of a reel, comprising a substantially round male coupling element coaxial and rigid with one of said driving and driven members, provided with a lateral flat and having a predetermined thickness as considered in a plane including the axis of said coupling element and extending at right angles to the flat, said flat being at least slightly convex as considered in the axial direction of said coupling element and having a center of curvature; a female coupling element coaxial and rigid with the other of said driving and driven menbers and defining a socket complementing to said male coupling element and having a lateral opening communicating with said socket and having a width at least matching said thickness so that said male coupling element is insertable into and withdrawable from said socket via said opening on movement of at least one of said coupling elements to an angular position in which said flat is out of register with said opening so that the latter permits the male coupling element to pass therethrough, said coupling elements being movable to angular positions in which said flat extends across said opening; and means for releasably holding said coupling elements in such angular positions, said holding means comprising a blocking member having a surface which is at least substantially complementary to said flat, said blocking member being mounted on said female coupling element for pivotal movement about an axis which is normal to the axis of said female coupling element and includes the center of curvature of said flat and said blocking member being pivotable to and from a position in which said surface thereof overlies said flat while said flat extends across said opening.

* * * * *